United States Patent
Hou et al.

(10) Patent No.: US 9,776,868 B2
(45) Date of Patent: *Oct. 3, 2017

(54) APPARATUS FOR PREPARING PHOSPHORIC ACID FROM FUME EXITING THE KILN IN A KILN PHOSPHORIC ACID PROCESS

(71) Applicant: SICHUAN KO CHANG TECHNOLOGY CO., LTD, Chengdu (CN)

(72) Inventors: Yonghe Hou, Chengdu (CN); Shifa Wei, Chengdu (CN); Chenjuan Wei, Chengdu (CN)

(73) Assignee: SICHUAN KO CHANG TECHNOLOGY CO., LTD., Chengdu (CN)

( * ) Notice: Subject to any disclaimer, the term of this patent is extended or adjusted under 35 U.S.C. 154(b) by 11 days.

This patent is subject to a terminal disclaimer.

(21) Appl. No.: 14/958,910

(22) Filed: Dec. 3, 2015

(65) Prior Publication Data

US 2016/0152474 A1  Jun. 2, 2016

Related U.S. Application Data

(63) Continuation-in-part of application No. PCT/CN2013/081207, filed on Aug. 9, 2013.

(30) Foreign Application Priority Data

Jun. 4, 2013  (CN) .......................... 2013 1 0218621

(51) Int. Cl.
*B01J 19/00* (2006.01)
*B01J 19/24* (2006.01)
(Continued)

(52) U.S. Cl.
CPC ........ *C01B 25/185* (2013.01); *B01D 53/1406* (2013.01); *B01D 53/40* (2013.01);
(Continued)

(58) Field of Classification Search
CPC ........ B01J 19/00; B01J 19/24; B01J 19/2455; B01J 19/2465; B01J 2219/00049;
(Continued)

(56) References Cited

U.S. PATENT DOCUMENTS 3,091,513 A † 5/1963 Parish
3,273,713 A † 9/1966 Parish
(Continued)

FOREIGN PATENT DOCUMENTS

CN  90105433.X C  10/1991
CN  93111447.0 C  12/1994
(Continued)

OTHER PUBLICATIONS

George C. Pedersen, The State of the Art in Gas Cleaning for the Fertilizer Industry, pp. 1-15 (Presented at Arab Fertilizer Association 2001).†

(Continued)

*Primary Examiner* — Natasha Young
(74) *Attorney, Agent, or Firm* — Zareefa B. Flener; Flener IP Law

(57) ABSTRACT

Disclosed is an apparatus for preparing phosphoric acid from a fume exiting the kiln in a kiln phosphoric acid process, the apparatus comprises a hydration tower and an acid solution cyclical spraying system, a fume inlet of the fume exiting the kiln is disposed at a lower portion of the hydration tower, a fume outlet after hydration and absorption is disposed at the top, a spraying device is disposed in a cavity of the hydration tower above the fume inlet, a liquid inlet of the acid solution cyclical spraying system is dis-
(Continued)

posed on a bottom of the hydration tower, a liquid outlet of the acid solution cyclical spraying system is connected to a liquid intake pipe of the spraying device. The present invention has the advantages of simple structure, reasonable layout, strong adaptability, high raw material utilization rate, reduced contaminant emissions, and high recovery rate of phosphoric acid etc.

17 Claims, 5 Drawing Sheets

(51) Int. Cl.
| | |
|---|---|
| C01B 25/00 | (2006.01) |
| C01B 25/16 | (2006.01) |
| C01B 25/18 | (2006.01) |
| C01B 25/20 | (2006.01) |
| B01D 53/00 | (2006.01) |
| B01D 53/14 | (2006.01) |
| B01D 53/32 | (2006.01) |
| B01D 53/34 | (2006.01) |
| B01D 53/38 | (2006.01) |
| B01D 53/40 | (2006.01) |

(52) U.S. Cl.
CPC ........... *B01J 19/24* (2013.01); *B01J 19/2465* (2013.01); *C01B 25/20* (2013.01); *B01D 2251/304* (2013.01); *B01D 2252/103* (2013.01); *B01D 2257/204* (2013.01); *B01D 2257/2027* (2013.01); *B01D 2257/55* (2013.01); *B01J 2219/0011* (2013.01); *B01J 2219/00074* (2013.01); *B01J 2219/00103* (2013.01); *B01J 2219/00108* (2013.01); *B01J 2219/00159* (2013.01); *B01J 2219/24* (2013.01)

(58) Field of Classification Search
CPC .... B01J 2219/00051; B01J 2219/00074; B01J 2219/00087; B01J 2219/00103; B01J 2219/00105; B01J 2219/00108; B01J 2219/0011; B01J 2219/00159; B01J 2219/24; C01B 25/00; C01B 25/16; C01B 25/18; C01B 25/185; C01B 25/20; B01D 53/00; B01D 53/14; B01D 53/1406; B01D 53/32; B01D 53/34; B01D 53/38; B01D 53/40; B01D 2251/00; B01D 2251/30; B01D 2251/304; B01D 2252/00; B01D 2252/10; B01D 2252/103; B01D 2257/00; B01D 2257/20; B01D 2257/202; B01D 2257/2027; B01D 2257/204; B01D 2257/55

See application file for complete search history.

(56) References Cited

U.S. PATENT DOCUMENTS

| | | | |
|---|---|---|---|
| 7,910,080 B2 † | 3/2011 | Megy | |
| 2012/0009112 A1* | 1/2012 | Kinose | ................... C01B 25/02 423/317 |
| 2016/0152475 A1* | 6/2016 | Hou | ........................ C01B 25/20 423/241 |

FOREIGN PATENT DOCUMENTS

| | | |
|---|---|---|
| CN | 200610125005.2 A | 6/2007 |
| CN | 200710052195.4 A | 10/2007 |
| CN | 200810069080.0 A | 7/2009 |

OTHER PUBLICATIONS

Morris et al, Fluorine Control and Recovery, Canadian Chemistry and Metallurgy, pp. 271-274, (Aug. 1937).†
Leder et al., New Process for Technical-Grade Phosphoric Acid, in Ind. Eng. and Chem. Process Design and Development 24(3), pp. 688-697 (American Chemical Society 1985).†
H.Y. Allgood et al., Design of Equipment to Produce Phosphoric Acid from Elemental Phosphorous, pp. 1-35 (Tennessee Valley Authority Jun. 1970).†
H.Y. Allgood et al., Superphosphoric Acid Plant, Industrial and Engineering Chemistry, vol. 59, pp. 18-28 (Jun. 1967).†
A Chemical Engineering Pictured Flowsheet, New Plant Makes Phosphoric Acid and Polyphosphates, Chemical Engineering, pp. 320-323 (Dec. 1954).†
Phosphoric-Polyphosphates: More Than One Way to Solve a Problem, Chemical Engineering, pp. 132, 134 (Dec. 1954).†
J.H. Walthall and M.M. Striplin, Superphosphoric Acid by Absorption of Phosphorus Pentoxide Vapor, Industrial and Engineering Chemistry, vol. 33, No. 8, pp. 995-1000 (Aug. 1941).†
M.M. Striplin, Chemical Engineering Report No. 2, Development of Processes and Equipment for Production of Phosphoric Acid, Wilson Dam, Alabama, pp. 1-16, 30-78 (Tennessee Valley Authority 1948).†
U.S. Environmental Protection Agency AP42, Fifth Edition, vol. 1, Inorganic Chemical Industry, Chapter 8, Jul. 1993 (Reformatted Jan. 1995); Section 8.9 Phosphoric Acid, pp. 8.9-1-8.9-8.†
John Munroe Craig, Fluoride Removal From Wet-Process Phosphoric Reactor Gases, pp. 1-201 (University of Florida 1970).†
W. Douglas Belle, Fertilizer Industry: Fertilizer Development & Environmental Protection, FSA Recovery from Phosphoric Acid Evaporators, pp. 1-3, 5, 7, 8 (Arab Fertilizer Association 2008).†
Paul A. Smith, History of Fluorine Recovery Processes, pp. 1-20 (IFA Technical Sub-Committee and Committee Meeting Sep. 15-17, 1999, Novgorod, Russia).†
European Fertilizer Manufacturers' Association, Best Available Techniques for Pollution Prevention and Control in the European Fertilizer Industry Booklet 4 of 8: Production of Phosphoric Acid, pp. 1-44 (2000).†

\* cited by examiner
† cited by third party

APPARATUS FOR PREPARING PHOSPHORIC ACID FROM FUME EXITING THE KILN IN A KILN PHOSPHORIC ACID PROCESS

CROSS-REFERENCE TO RELATED APPLICATION

The application is a continuation in part of PCT/CN2013/081207, WO2014/194569 (filed on Aug. 9, 2013), which claims priority of CN Patent Application Serial No. 201310218621.2 (filed on Jun. 4, 2013) the contents of which are incorporated herein by reference in their entirety.

FIELD OF THE INVENTION

The present invention relates to an apparatus for preparing phosphoric acid from a fume containing phosphorus, particular to an apparatus for preparing phosphoric acid from a fume exiting the kiln in a kiln phosphoric acid (KPA) process.

BACKGROUND OF THE INVENTION

At present, there are chiefly two processes for producing phosphoric acid in industry. (1) producing phosphoric acid with a wet process: using sulfuric acid to decompose phosphate ore to obtain dilute phosphoric acid and solid slag (briefly called phosphogypsum) with $CaSO_4.nH_2O$ as a main component, and concentrating the dilute phosphoric acid to obtain wet-process phosphoric acid with about 54% phosphoric acid. This process has the following major drawbacks: the first drawback is large consumption of sulfuric acid; the second drawback is that the slag phosphogypsum cannot be used effectively, and sulfuric acid, phosphoric acid and soluble fluorides entrained therein are all soluble in water, and rain wash of the slag piled in the nature is apt to cause serious pollution to the environment; the third drawback is that the resultant phosphoric acid contains higher contain of impurities and is generally only used to produce fertilizer; and the fourth drawback is that high-grade phosphate ore must be used to ensure economy of the product. (2) producing phosphoric acid with a hot process: first, placing phosphate ore, silica and carbonaceous solid reductant in an ore-smelting electric furnace, raising a temperature in the furnace to 1300 with energy of electric arc formed by electrical short-circuiting, reducing phosphor in the phosphate ore in the form of $P_4$, meanwhile converting carbonaceous solid reductant into CO, washing gas mainly containing $P_4$ and CO discharged out of the ore-smelting electric furnace with water, cooling $P_4$ into solid to separate from gas phase to obtain the product yellow phosphorus, igniting and burning exhaust gas containing CO at an outlet of a chimney and exhausting to the atmosphere; heating the obtained $P_4$ to 80 to change it into liquid phase, subjecting it to oxidization combustion reaction with introduced air in a hydration tower to obtain phosphoric anhydride $P_2O_5$, and then absorbing it with water to obtain phosphoric acid. The hot-process production of phosphoric acid has the following main drawbacks: the first drawback is large consumption of electrical energy; the second drawback is that gas discharged out of the ore-smelting electric furnace, from which $P_4$ is already separated, still entrains a large amount of fluorides (existing in the form of $SiF_4$ and HF) and a small amount of un-deposited gas $P_4$, which causes serious pollution to the atmospheric environment; the third drawback is that gas containing a large amount of CO is directly burnt and exhausted, which causes large waste of energy; the fourth drawback is that high-grade phosphate ore needs to be used to ensure economy of the production.

To overcome impact on production of phosphoric acid exerted by shortage of electrical energy, insufficient pyrites resources and gradual reduction of high-grade phosphate core, Occidental Research Corporation of the United States proposed a KPA process in 1980's, i.e., a process of producing phosphoric acid with a rotary kiln (briefly called a phosphoric acid producing process with a kiln) (see Frederic Ledar and Won C. Park, et al., New Process for Technical-Grade Phosphoric Acid, Ind. Eng. Chem. Process Des. Dev 1985, 24, 688-697), and carried out a pilot experiment of a pilot device in a 0.84 m (inner)×9.14 m (see the US patent document U.S. Pat. No. 4,389,384). According to this process, phosphate ore, silica and carbonaceous reductant (coke powder or coal powder) are co-ground so that 50%-85% of the co-ground materials passes a −325 mesh, with 1% bentonite being added to produce balls, which are dried and preheated by a chain-type dryer and then delivered into a rotary kiln with a kiln head in which natural gas is burnt, pellets are reduced in the kiln, a maximum solid temperature is controlled as 1400-1500, pellet $CaO/SiO_2$ mole ratio is adjusted as 0.26-0.55 so that the a melting point of the pellet is higher than a carbon thermal reduction temperature of the phosphate core in the pellets, phosphor is reduced and volatiles out of the pellets in the form of phosphoric vapor, and then oxidized by air introduced in a middle space of the kiln into phosphorous pentoxide, heat resulting from oxidization is then supplied to the reduction reaction, and finally kiln gas containing phosphorous pentoxide is hydrated and absorbed to obtain phosphoric acid.

The idea of the above processing phosphoric acid with a kiln exhibits an excellent industrial application prospect because its principle is to form $P_4$ gas using carbon thermal reduction of the phosphate ore, transfer phosphorus in the phosphate ore to gas phase of the rotary kiln, use a gas-solid separation principle to enable phosphorus to be well separated from other solid substances in the balls, allow the $P_4$ gas transferred into the gas phase of the rotary kiln to go through an oxidization heat liberation reaction with oxygen in the gas phase of the rotary kiln to generate $P_2O_5$, supply the liberated heat to carbon thermal reduction (endothermic reaction) of the phosphate ore in the material balls, and finally hydrate and absorb the kiln gas containing $P_2O_5$ exiting the rotary kiln to obtain industrial phosphoric acid having a cleanliness much higher than the phosphoric acid produced with the wet process. Since the rotary kiln uses primary energy to maintain phosphate ore carbon terminal reduction temperature, and meanwhile flammable substance $P_4$ generated from the phosphate ore carbon terminal reduction and CO are subjected to the combustion heat liberation reaction in the interior of the rotary kiln to replenish the energy needed to maintain the phosphate ore carbon terminal reduction temperature in the rotary kiln, this process substantially reduces energy consumption as compared with the conventional hot process of producing phosphoric acid.

However, the research indicates that it is very difficult to implement the process of producing phosphoric acid with the kiln in large-scale industrial application and practice and its main drawbacks are as follows:

1. A rotary kiln is an apparatus with a kiln body rotating at a certain speed (0.5 r/min-3 r/min), and it is advantageous in continuously performing mechanical turn and mixture of a solid material fed into the kiln to ensure uniformity of heat reception of the solid material at all locations in the kiln. However, the solid material in the kiln must bear a mechanical frictional force resulting from movement of the material. If a strength of the material is smaller than the received mechanical frictional force, the material can be easily destroyed. A basic principle of the KPA process proposed by ORC corporation of the United States is to co-grind the phosphate ore, the silica and the carbonaceous reductant (coke powder or coal powder) so that 50%-80% of the co-ground materials passes 325 mesh, and then produce them into pellets, the three kinds of substances must be closely copolymerized into a whole so that the mixture does not melt at the carbon thermal reduction temperature of the phosphate ore under the condition the $CaO/SiO_2$ mole ratio in the mixture is 0.26-0.55, and meanwhile carbon reduction of the phosphate ore can be performed smoothly. However, since the reductant carbon is added to the material pellets used in the process, carbon goes through quick oxidization reaction with oxygen in air at a temperature greater than 350 to produce $CO_2$. If a conventional method of consolidating pellets at a high temperature (≥900) at a chain grate in the metallurgical industry is employed, the reducing carbon in the pellets will be all oxidized, the pellets entering the rotary kiln will lose the reductant, carbon thermal reduction reaction of the phosphorus naturally cannot be performed, and the process fails as a result. If only the bentonite is added as a bonding agent of the pellets to perform drying and dehydration at a temperature less than 300, an anti-pressure strength of the pellets is only about 10 KN per ball, with a falling strength≤1 time per meter; since an acting mechanism of the bentonite is mainly to use interlayer water in its substance structure to adjust a moisture content release speed during the drying of the pellets and improve a burst temperature of the pellets during the drying, and bentonite itself does not play a remarkable role in improving the strength of the pellets. After such pellets are fed into the rotary kiln and before the rotary kiln temperature value reaches 900, since the pellets entering the kiln cannot bear the mechanical frictional force resulting from movement of material balls in the pellets, a lot of said pellets are pulverized, and thereafter the phosphate ore powder, silica powder and carbonaceous reductant forming the pellets will separate, the phosphate ore powder after pulverization causes failure of reduction of phosphorus as it cannot get in close contact with carbonaceous reductant. More seriously, once the phosphate ore powder separates from silica powder, its melting point abruptly falls below 1250. When such powder-like phosphate ore passes through a high-temperature reducing area (with a material layer temperature of 1300 or so) of the rotary kiln, it will totally changes from solid phase into a liquid phase, and thereby adheres to a liner of the rotary kiln to form high-temperature ringing of the rotary kiln, which hinders normal rotation of the materials in the rotary kiln so that a majority of materials added into the rotary kiln overflows from the rotary kiln from a feeding end of the rotary kiln, high-temperature reduction of phosphorus cannot be achieved and the process fails. It can be seen that the raw materials entering the kiln have their intrinsic drawbacks, any industrialized, large-scale or commercialized application of the above-mentioned KPA technology has not yet been witnessed so far.

2. Regarding the KPA process with the phosphate ore pellets with carbon being added, a solid material area below a material layer in the rotary kiln belongs to a reduction zone, and a gas flow area of the rotary kiln is above the material layer and belongs to an oxidization zone, the feed pellets are added from a kiln tail of the rotary kiln and discharged out of a kiln head of the rotary kiln by virtue of its own gravity and a frictional force resulting from rotation of the rotary kiln, a burner for burning fuel in the rotary kiln is mounted at the kiln head of the rotary kiln, fume resulting from the burning is introduced out by a blower at the kiln tail, a micro negative pressure is maintained in the rotary kiln, and the gas flow is opposite to a movement direction of the materials. Since there is not a mechanical isolation area between the reduction zone (solid material layer area) and the oxidization zone (the gas flow area above the solid material layer area of the rotary kiln) of the rotary kiln, the material balls exposed on the surface of the solid material layer area and $O_2$, $CO_2$ in the gas flow in the oxidization zone are subjected to convective mass transfer; on the one hand, this causes the reductant in the material balls to be partially oxidized before the material balls are heated by the gas flow heat transfer to the carbon reduction temperature of the phosphate ore so that the material balls are not sufficiently reduced due to shortage of carbonaceous reductant in the reduction zone of the rotary kiln; more seriously, the material balls exposed to the surface of the material layer at the high-temperature area of the rotary kiln is further subjected to chemical reaction with $P_2O_5$ already generated from reduction in the kiln gas to produce calcium metaphosphate, calcium phosphate and other metaphosphates or phosphates, thereby causing the phosphorus already reduced into the gas phase to return to the material balls again and form a layer of white crust rich in $P_2O_5$ on the surface of the material balls, the layer of crust generally having a thickness of 300 μm-1000 μm, the content of $P_2O_5$ in the layer of crust topping 30%; as a result, $P_2O_5$ transferred from the material balls to the gas phase does not exceed 60%, which cause a lower yield ratio of $P_2O_5$ in the phosphate ore and thereby causes waste of mineral resources and large rise of the phosphoric acid production cost so that the above KPA process losses value in respect of commercial application and industrial spread. Researchers desire gas volatized from the material layer to isolate the reduction zone from the oxidization zone in the rotary kiln, but industrial experiments performed in a rotary kiln with an inner diameter 2 m show that the phenomena of white crust rich in $P_2O_5$ on the surface of the pellets still cannot be avoided.

Due to the above-mentioned technical drawbacks, it is still very difficult to use the KPA process proposed by ORC Corporation in large-scale industrial application and practice to produce phosphoric acid.

Joseph A. Megy proposes some improved technical methods with respect to the KPA process (see US patent document U.S. Pat. No. 7,910,080B), i.e., on the premise of maintaining the basis process of KPA unchanged, providing a material stopping ring on a kiln head material discharging end of the cylinder of the rotary kiln to improve a solid material filling rate of the rotary kiln, and meanwhile increasing the diameter of the rotary kiln to reduce a surface area to volume ratio of an inner material layer of the rotary kiln, reduce probability of the material of the material layer being exposed to the surface of the solid material layer to shorten the time that the reductant carbon in the material balls is oxidized by $O_2$ in the kiln gas in the rotary kiln, reduce burn of the reductant carbon before the material balls reach the reduction zone of the rotary kiln and meanwhile decease generation of phosphates or metaphosphates on the surface of the material balls in the high-temperature area of the rotary kiln. In addition, according to the process, it is desired that partial petroleum coke is added to the materials entering the rotary kiln so that reducing gas generated by a volatile matter in the petroleum coke due to heat reception and volatilization is used to cover between the material layer and the gas flow oxidization area of the rotary kiln to further block the probability of the $O_2$ and $P_2O_5$ in the gas flow in the rotary kiln reacting with the material balls to ensure normal operation of the process. However, increase of the filling rate of the rotary kiln allows the material balls to bear larger mechanical frictional force in the rotary kiln, thereby causing a larger proportion of pulverization of the material balls in the rotary kiln, and forming more substances with a melting point lower than the phosphate ore carbon thermal reduction temperature so that the high-temperature ringing of the rotary kiln becomes quicker and more serious and earlier failure of the process is caused. In addition, the volatile matter generated by added small amount of petroleum coke is not sufficient to produce sufficient gas and it is difficult to form an effective isolation layer between the solid material layer of the rotary kiln and the gas flow area in the rotary kiln. If an excessive amount is added, the materials in the rotary kiln will entrain a large amount of fuel so that in a slag ball cooling machine in the subsequent process, the redundant fuel is confronted with the air for cooling the slag balls and burns rapidly, a large amount of heat resulting from the burning not only increases the difficulty in cooling the high-temperature slag balls exiting the rotary kiln but also substantially increases the production cost of the process and makes implementation of the commercialized and large-scale application of the process impossible.

However, in subsequent research, we finds a series of new technical problems, of which there are some technical problems reflected in process of taking up phosphorus by hydration and recovering fluorine. The process of taking up phosphorus by hydration is mainly reference the process of taking up phosphorus by thermal phosphoric acid, but there is a big difference between the fume exciting the kiln in kiln phosphorus acid process and the fume obtained after combustion of phosphorus in thermal phosphoric acid: First, the concentration of $P_2O_5$ in fume exciting the kiln is low, the amount of the fume in former is 3 to 4 times the latter in the same scale yields; secondly, the composition of the fume exciting the kiln in kiln phosphoric acid is complex, containing fluoride, dust, $SO_2$ and other impurities. Therefore, there are many problems if we still follow the traditional thermal phosphoric acid producing method: first, during subsequent phosphoric acid producing stage, the amount of fume in thermal process for producing phosphoric acid is small, a fume flow speed of the apparatus is low, if applied directly to the kiln phosphoric acid process, the apparatus system is rather massive and structurally complicated, and the cost for investment and operation is relatively high; secondly, content impurities in the fume of the kiln phosphoric acid process is complicated, the corrosivety of the acid sprayed is stronger, to prevent solid impurities in acid clogging equipment and piping, the yield of the acid technology and the structure of the equipment need further improvement; and more importantly, the fume exiting the kiln also contains fluorine-containing substance (existing in the form of $SiF_4$ and HF) harmful to the human body, it needs to be recovered and meanwhile pollution to the environment is avoided.

Therefore, in order to reduce production costs and operating expenses in kiln phosphoric acid process, ensure the product quality of phosphoric acid, full use of the resources and avoid environmental pollution, the apparatus of the taking up phosphorus by hydration and ancillary apparatus in kiln phosphoric acid process need to be modified and improved by those skilled in the art.

SUMMARY OF THE INVENTION

The technical problem to be solved by the present invention is to overcome drawbacks in the prior art and provide a device for producing phosphoric acid in a kiln phosphoric acid process with a simple structure, reasonable layout, low investment cost, adaptability, high raw material utilization, less pollutant discharge and high phosphate recovery and good effect.

To solve the technical problem described above, the present invention proposes the following technical solutions:

An apparatus for preparing phosphoric acid from a fume exiting the kiln in a kiln phosphoric acid process, the apparatus comprises a hydration tower and an acid solution cyclical spraying system, a phosphoric acid mist capturing tower and a mist removing and separating tower are connected with the hydration tower, a fume inlet of the fume exiting the kiln is disposed at a lower portion of the hydration tower, a fume outlet after hydration and absorption is disposed at the top, a spraying device is disposed in a cavity of the hydration tower above the fume inlet, a liquid inlet of the acid solution cyclical spraying system is disposed on a bottom of the hydration tower, a liquid outlet of the acid solution cyclical spraying system is connected to a liquid intake pipe of the spraying device.

LISTING OF PARTS

Figure 1:
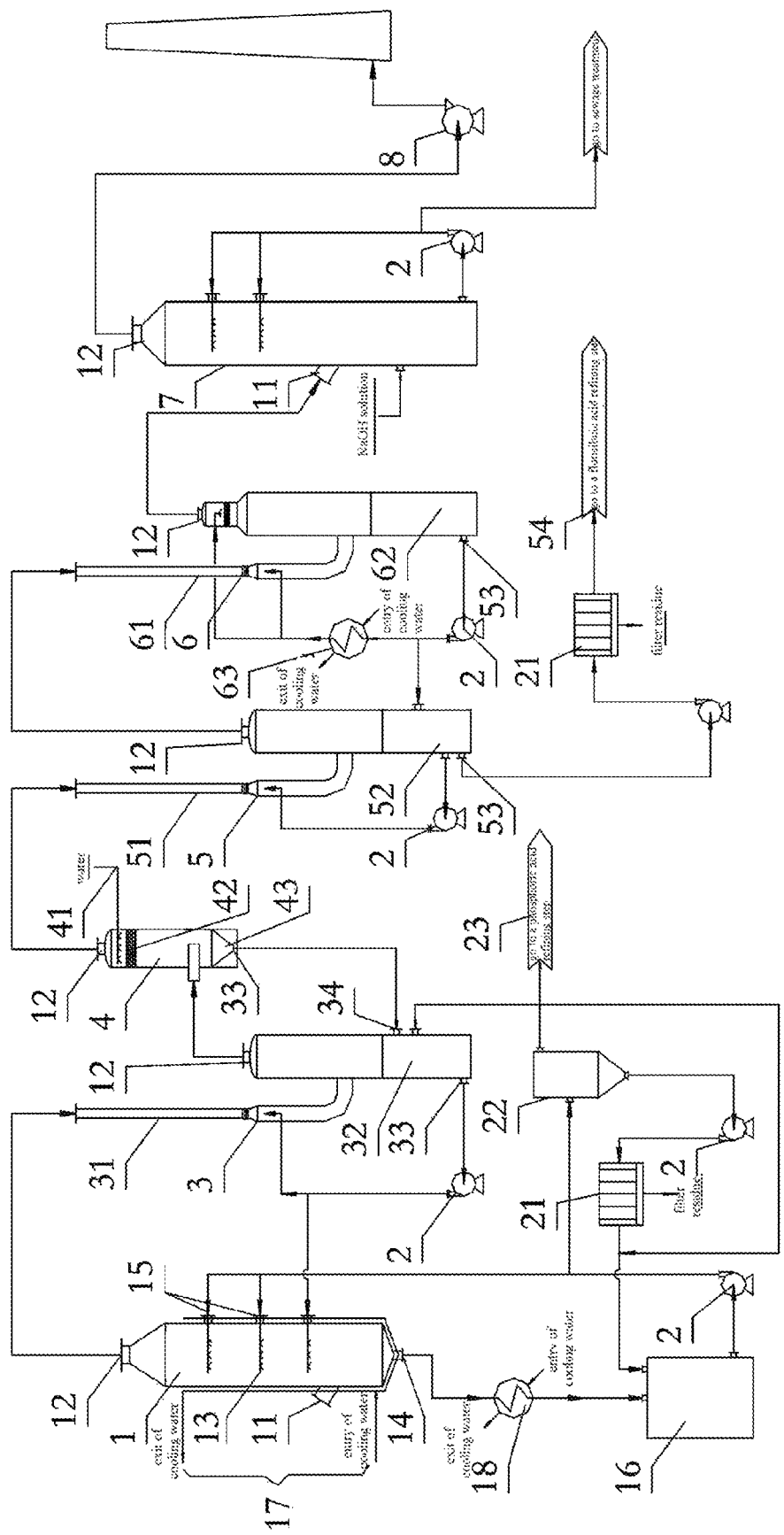
FIG. 1 is a structural schematic view of phosphoric acid-producing apparatus in a specific embodiment of the present invention.

The reference number 1 denotes a hydration tower, 11 a fume inlet; 12 a fume outlet; 13 a spraying device; 14 a liquid inlet; 15 a liquid outlet; 16 an acid solution storage tank; 17 a water-cooling system; 18 an acid cooler; 2 a circulating pump; 21 a filter-pressing device; 22 a filler filtering device; 23 a phosphoric acid refining apparatus; 24 a concentrated phosphoric acid spraying layer; 25 a dilute phosphoric acid spraying layer; 3 a phosphoric acid mist capturing tower; 31 a washing pipe; 32 a separation tank; 33 an acid solution outlet; 34 an acid solution inlet; 35 a nozzle; 4 a mist removing and separating tower; 41 an online water-washing device; 42 a wire mesh demister; 43 a phosphoric acid liquid droplet capturing structure; 5 a primary fluorine absorbing tower; 51 a fluosilicic acid washing pipe; 52 a fluosilicic acid separating tank; 53 a fluosilicic acid solution outlet; 54 a fluosilicic acid refining apparatus; 6 a secondary fluorine absorbing tower; 61 a secondary fluosilicic acid washing pipe; 62 a secondary fluosilicic acid separating tank; 63 a fluosilicic acid cooler; 7 an exhaust gas absorbing tower; 8 a blower.

DETAILED DESCRIPTION OF THE INVENTION

The embodiments of the present invention are described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be through and complete, and will fully convey the scope of the invention to those skilled in the art. Among other things, the present invention may be embodied as systems, methods or devices. The following detailed description should not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on". The term "coupled" implies that the elements may be directly connected together or may be coupled through one or more intervening elements. Further reference may be made to an embodiment where a component is implemented and multiple like or identical components are implemented.

While the embodiments make reference to certain events this is not intended to be a limitation of the embodiments of the present invention and such is equally applicable to any event where goods or services are offered to a consumer.

In an embodiment of the present invention, an apparatus for preparing phosphoric acid from a fume exiting the kiln in a kiln phosphoric acid process, the apparatus comprises a hydration tower and an acid solution cyclical spraying system, a fume inlet of the fume exiting the kiln is disposed at a lower portion of the hydration tower, a fume outlet after hydration and absorption is disposed at the top, a spraying device is disposed in a cavity of the hydration tower above the fume inlet, a liquid inlet of the acid solution cyclical spraying system is disposed on a bottom of the hydration tower, a liquid outlet of the acid solution cyclical spraying system is connected to a liquid intake pipe of the spraying device.

In an embodiment of the present invention, a phosphoric acid mist capturing tower and a mist removing and separating tower are connected with the hydration tower, In an embodiment of the present invention, a body of the hydration tower is a spraying empty tower.

In an embodiment of the present invention, an acid solution storage tank and a circulating pump are further disposed in the acid solution cyclical spraying system.

In an embodiment of the present invention, the apparatus further comprises cooling system, the cooling system comprises the following structures a and/or b:
a, a water-cooling system is provided around an outer wall of the cavity of the hydration tower;
b, an acid cooler is disposed at a position of the acid solution cyclical spraying system adjacent to the fluid inlet.

In an embodiment of the present invention, the phosphoric acid mist capturing tower mainly comprises a washing pipe and a separation tank, a fume outlet of the hydration tower is communicated with an inlet of the washing pipe via a pipe, an outlet of the washing pipe is communicated with a middle portion of the separation tank, a top portion of the separation tank is provided with the fume outlet, an acid solution outlet is disposed on the bottom, the acid solution outlet is communicated with a nozzle in the washing pipe via a circulating and delivering pipe with the circulating pump.

In an embodiment of the present invention, the fume outlet of the phosphoric acid mist capturing tower is communicated with a lower portion of a mist removing and separating tower through a pipe, a top of the mist removing and separating tower is provided with the fume outlet, a bottom of the mist removing and separating tower is provided an acid solution outlet, and the acid solution outlet is communicated with an acid solution inlet of the phosphoric acid mist capturing tower via a pipe.

In an embodiment of the present invention, an online water-washing device is disposed in the mist removing and separating tower.

In an embodiment of the present invention, an upper portion of the mist removing and separating tower is mounted with a wire mesh demister, a lower portion is designed as a phosphoric acid solution droplet capturing structure like a cyclone deduster, and the online water-washing device is mounted above the wire mesh demister.

In an embodiment of the present invention, the fume outlet of the mist removing and separating tower is communicated with a fluorine absorbing device, the fluorine absorbing device is a primary fluorine absorption tower as the main body, the primary fluorine absorption tower employs a liquid-state reverse-flow washing tower, and mainly comprises a fluosilicic acid washing pipe and a fluosilicic acid separating tank.

In an embodiment of the present invention, the fume outlet of the mist removing and separating tower is communicated with an inlet of the fluosilicic acid washing pipe via a pipe, an outlet of the fluosilicic acid washing pipe is communicated with a middle portion of the fluosilicic acid separating tank, a fume outlet is disposed on top of the fluosilicic acid separating tank, a fluosilicic acid solution outlet is disposed on the bottom, the fluosilicic acid solution outlet is communicated with a nozzle in the fluosilicic acid washing pipe via a circulating and delivering pipe having a circulating pump, the fluosilicic acid solution outlet is additionally connected with an external fluosilicic acid refining apparatus or a villiaumite processing apparatus via a pipe.

In an embodiment of the present invention, the fluorine absorption device further comprises a secondary fluorine absorbing tower, the secondary fluorine absorbing tower employs a liquid-state reverse-flow washing tower, and mainly comprises a secondary fluosilicic acid washing pipe and a secondary fluosilicic acid separating tank.

In an embodiment of the present invention, the fume outlet of the primary fluorine absorption tower is communicated with an inlet of the secondary fluosilicic acid washing pipe, an outlet of the secondary fluosilicic acid washing pipe is communicated with a middle portion of the secondary fluosilicic acid separating tank, a despumation layer and a fume outlet are disposed on top of the secondary fluosilicic acid separating tank, a fluosilicic acid solution outlet is disposed on the bottom, and the fluosilicic acid solution outlet is communicated with the secondary fluosilicic acid washing pipe and the fluosilicic acid separating tank of primary fluorine absorbing tower via the circulating and delivering pipe having a circulating pump.

In an embodiment of the present invention, a fluosilicic acid cooler is further provided on the circulating and delivering pipe of the secondary fluorine absorbing tower, an outlet of the fluosilicic acid cooler is communicated with a nozzle in the secondary fluosilicic acid washing pipe and a spraying layer at the top of the secondary fluosilicic acid separating tank.

In an embodiment of the present invention, the fume outlet of the secondary fluorine absorbing tower is further connected with an exhaust gas absorbing tower which is a spraying empty tower, a fume outlet is disposed at the top of the exhaust gas absorbing tower, a spraying layer is disposed at an upper portion in the tower, a bottom in the tower is provided with a alkali absorption liquid box whose outlet is connected with the respective spraying layers of the exhaust gas absorbing tower via the circulating and delivering pipe having the circulating pump.

In an embodiment of the present invention, the spraying device comprises at least two spraying layers located at different heights of the cavity of the hydration tower, the at least two spraying layers comprise a dilute phosphoric acid spraying layer and a concentrated phosphoric acid spraying layer, and the concentrated phosphoric acid spraying layer is disposed above the dilute phosphoric acid spraying layer; a liquid intake pipe of the concentrated phosphoric acid spraying layer is communicated with the acid solution cyclical spraying system, a liquid intake pipe of the dilute phosphoric acid spraying layer is communicated with a circulating and delivering pipe of the phosphoric acid mist capturing tower. The delivering pipe of the acid solution cyclical spraying system after the circulating pump is connected to an acid solution inlet of the phosphoric acid mist capturing tower via a branch pipe.

In an embodiment of the present invention, the branch pipe is provided with a filler filtering device, an acid inlet of the filler filtering device is communicated with the acid solution cyclical spraying system via the branch pipe, a filtering outlet of the filler filtering device is divided into three paths: one path is communicated with the acid solution inlet of the phosphoric acid mist capturing tower, a second path is communicated with an external phosphoric acid refining apparatus, and a third path is communicated with the acid solution storage tank; a bottom flow outlet of the filler filtering device is connected to a feed port of a filter-pressing device via a pipe, an overflow port of the filter-pressing device is communicated with the acid solution storage tank in the acid solution cyclical spraying system via a pipe.

EXAMPLES

Figure 2:
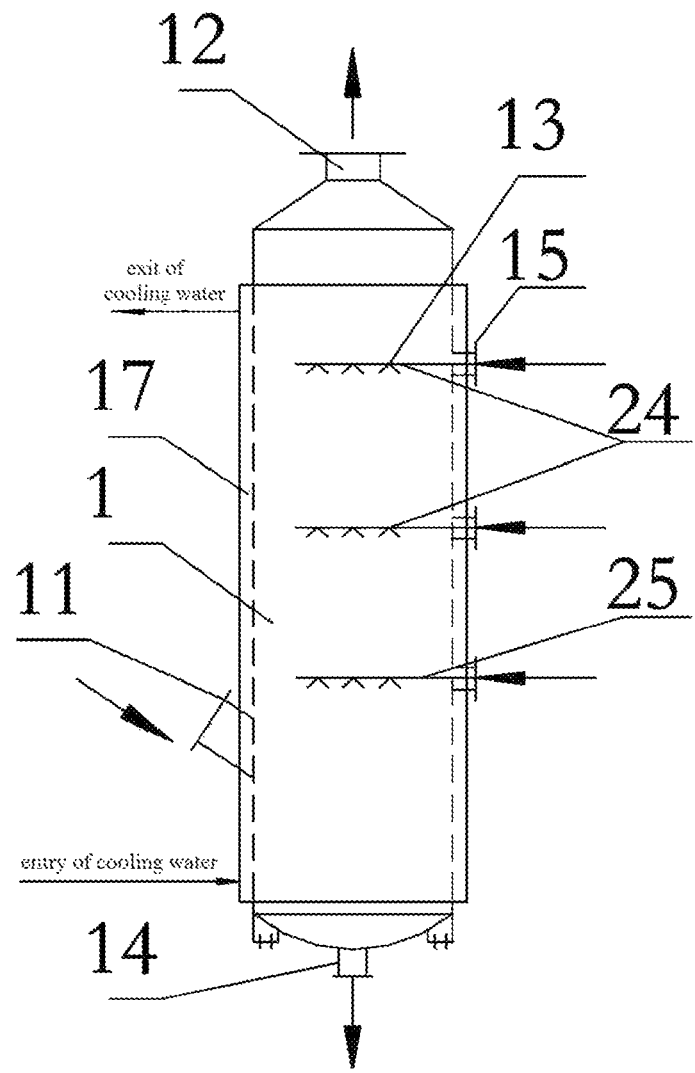
FIG. 2 is an enlarged structural schematic view of a hydration tower of a phosphoric acid-producing apparatus in a specific embodiment of the present invention.
Figure 3:
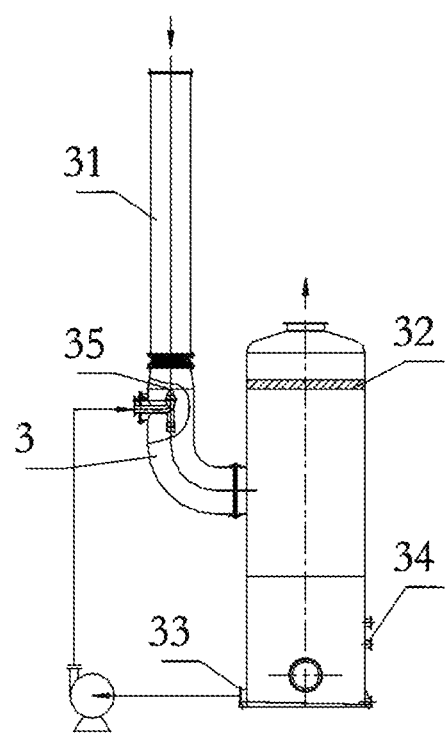
FIG. 3 is an enlarged structural schematic view of a phosphoric acid mist capturing tower of a phosphoric acid-producing apparatus in a specific embodiment of the present invention.
Figure 4:
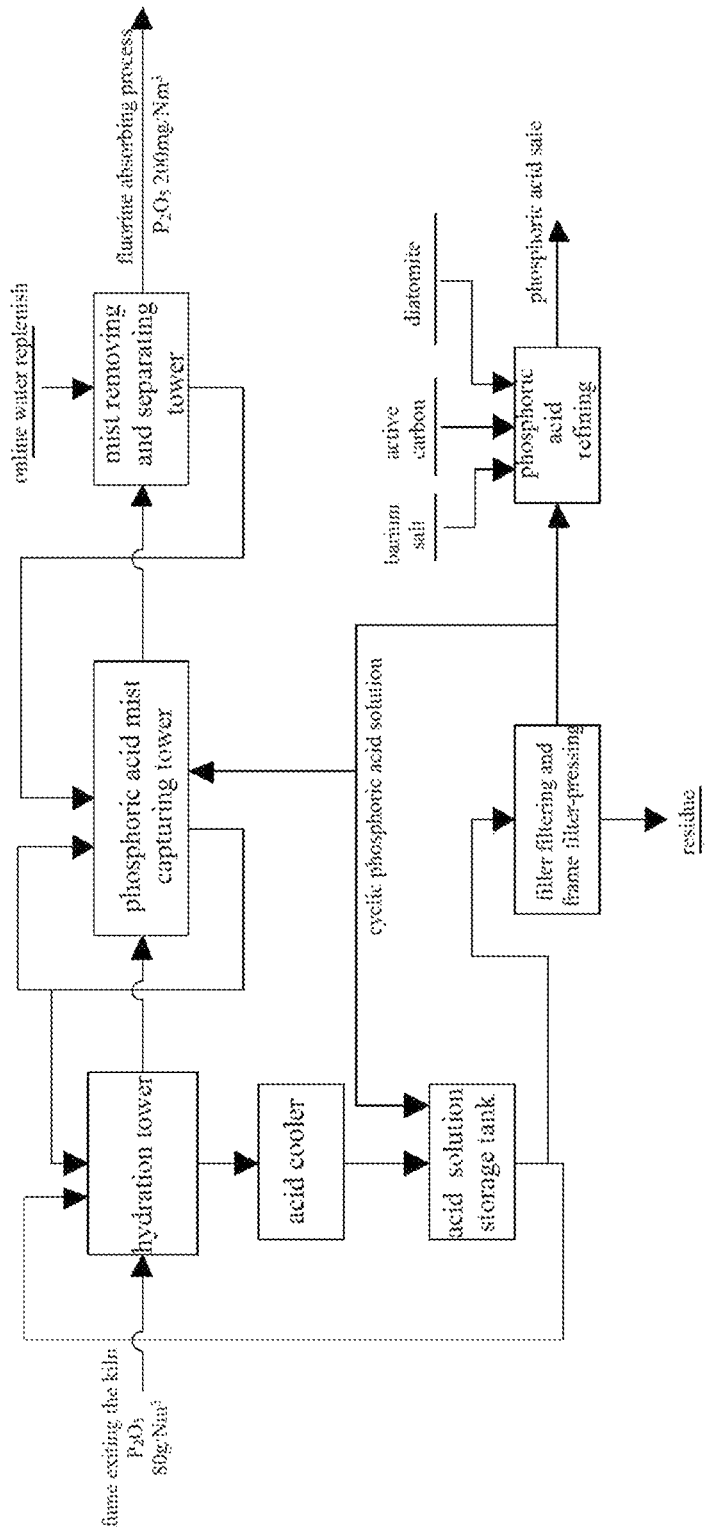
FIG. 4 is a flowchart of a process of taking up phosphorus by hydration in a specific embodiment of the present invention.
Figure 5:
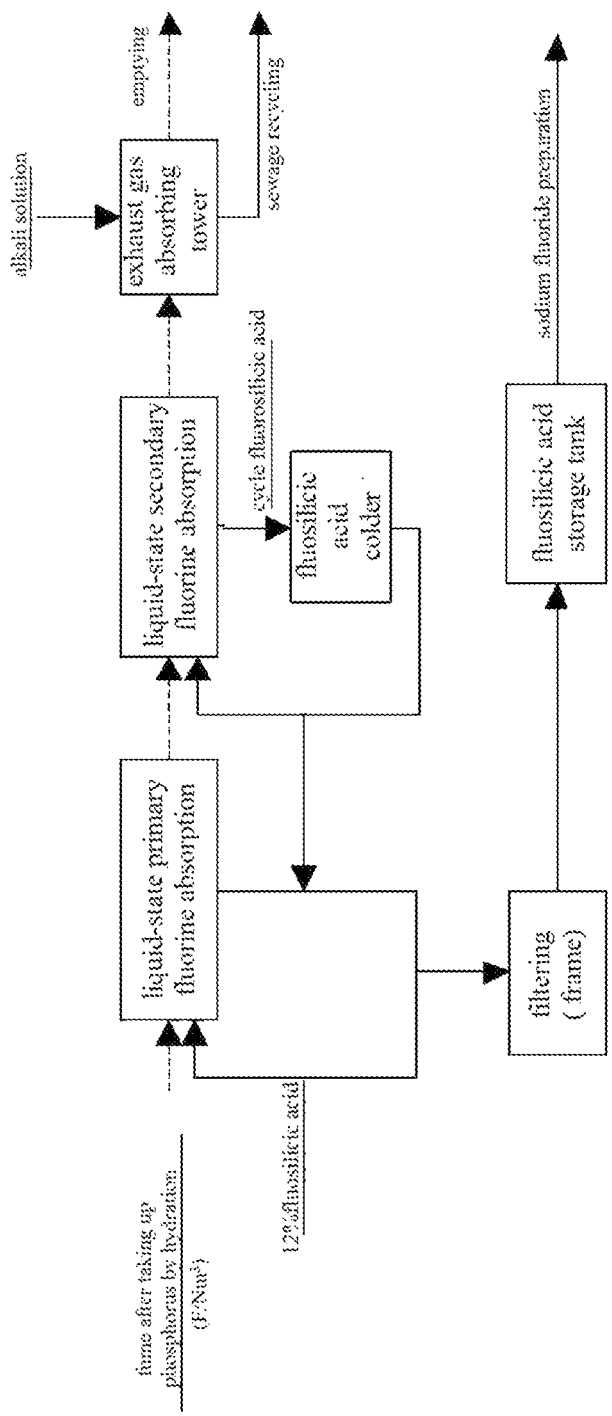
FIG. 5 is a flowchart of a process of recovering fluorine in a specific embodiment of the present invention.

An phosphoric acid preparing apparatus from a fume exiting the kiln in a kiln phosphoric acid process as shown in FIG. 1-3. The apparatus comprises a hydration tower 1 and an acid solution cyclical spraying system. The material of the hydration tower 1 is Hastelloy or graphite brick building. A fume inlet 11 of the fume exiting the kiln is disposed at a lower portion of the hydration tower 1, a fume outlet 12 after hydration and absorption is disposed at the top, a spraying device 13 is disposed in a cavity of the hydration tower 1 above the fume inlet 11, a liquid inlet 14 of the acid solution cyclical spraying system is disposed on a bottom of the hydration tower 1, a liquid outlet 15 of the acid solution cyclical spraying system is connected to a liquid intake pipe of the spraying device 13, and an acid solution storage tank 16 and a circulating pump 2 are further disposed in the acid solution cyclical spraying system. A water-cooling system 17 is provided around an outer wall of the cavity of the hydration tower 1 of the present embodiment, and the cooling water in the water-cooling system 17 enters from bottom and exits from top. In addition, an acid cooler 18 is disposed at a position of the acid solution cyclical spraying system adjacent to the fluid inlet 14; an outlet of the acid cooler 18 is connected with an inlet of the acid solution storage tank 16, an outlet of the acid solution storage tank 16 is connected with the liquid intake pipe of the spraying device 13 via the circulating pump 2 to thereby form an acid solution cyclical spraying system.

In the phosphoric acid preparing apparatus of the present embodiment, a phosphoric acid mist capturing tower 3, a mist removing and separating tower 4, a primary fluorine absorbing tower 5, a secondary fluorine absorbing tower 6, an exhaust gas absorbing tower 7 and a blower 8 are connected with the downstream of the hydration tower 1 in turn.

Specifically, the phosphoric acid mist capturing tower 3 is an efficient fluid-state reverse-flow washing tower which mainly comprises a washing pipe 31 and a separation tank 32, the fume outlet 12 of the hydration tower 1 is communicated with an inlet of the washing pipe 31 via a pipe, an outlet of the washing pipe 31 is communicated with a middle portion of the separation tank 32, a top portion of the separation tank 32 is provided with the fume outlet 12, an acid solution outlet 33 is disposed on the bottom, the acid solution outlet 33 is communicated with a nozzle 35 in the washing pipe 31 via a circulating and delivering pipe with the circulating pump 2 (see FIG. 3), and the separation tank 32 also serves as an acid circulating tank of the circulating and delivering pipe of the phosphoric acid mist capturing tower 3.

To achieve acid crossflow of the hydration tower 1 and the phosphoric acid mist capturing tower 3, the spraying device 13 of the hydration tower in the present embodiment is provided with three spraying layers located at different heights of the cavity of the hydration tower 1, the three spraying layers comprise one a dilute phosphoric acid spraying layer 25 and two concentrated phosphoric acid spraying layers 24 (see FIG. 2), and the two concentrated phosphoric acid spraying layers 24 are disposed above the dilute phosphoric acid spraying layer 25; a liquid intake pipe of the concentrated phosphoric acid spraying layer 24 is communicated with the acid solution cyclical spraying system of the hydration tower 1, a liquid intake pipe of the dilute phosphoric acid spraying layer 25 is communicated with the circulating and delivering pipe of the phosphoric acid mist capturing tower 3 so as to achieve crossflow of the acid solution in the phosphoric acid mist capturing tower 3 to the hydration tower 1. In addition, the delivering pipe of the acid solution cyclical spraying system after the circulating pump 2 is connected to an acid solution inlet 34 of the phosphoric acid mist capturing tower 3 via a branch pipe. For coherence with subsequent filtration and refining step of phosphoric acid, a branch pipe is provided with a filler filtering device 22, an acid inlet of the filler filtering device 22 is communicated with the acid solution cyclical spraying system via the branch pipe, a filtering outlet of the filler filtering device 22 is divided into three paths: one path is communicated with the acid solution inlet 34 of the phosphoric acid mist capturing tower 3, a second path is communicated with an external phosphoric acid refining apparatus 23, and a third path is communicated with the acid solution storage tank 16; a bottom flow outlet of the filler filtering device 22 is connected to a feed port of a filter-pressing device 21 via a pipe, an overflow port of the filter-pressing device 21 is communicated with the acid solution storage tank 16 in the acid solution cyclical spraying system via a pipe to sufficiently achieve recovery and use of the phosphoric acid and ensure a high recovery rate of phosphoric acid.

In addition, the fume outlet 12 of the phosphoric acid mist capturing tower 3 is communicated with a lower portion of a mist removing and separating tower 4 through a pipe, a top of the mist removing and separating tower 4 is provided with the fume outlet 12, a bottom of the mist removing and separating tower 4 is provided an acid solution outlet 33, and the acid solution outlet 33 is communicated with an acid solution inlet 34 of the phosphoric acid mist capturing tower 3 via a pipe. An online water-washing device 41 is disposed in the mist removing and separating tower 4, water added to the online water-washing device 41 meanwhile may serve as replenish water for the whole process for manufacturing phosphoric acid by absorbing phosphorus by hydration, and is replenished level by level back to the upstream phosphoric acid mist capturing tower 3 and hydration tower 1 via a pipe. An upper portion of the mist removing and separating tower 4 is mounted with a wire mesh demister 42, a lower portion is designed as a phosphoric acid solution droplet capturing structure like a cyclone deduster, and the online water-washing device 41 is mounted above the wire mesh demister 42.

In addition, the fume outlet 12 of the mist removing and separating tower 4 is communicated with a fluorine recovery apparatus. The fluorine recovery apparatus used in the present embodiment comprises a primary fluorine absorbing tower 5 and a secondary fluorine absorbing tower 6. The primary fluorine absorbing tower 5 and the secondary fluorine absorbing tower 6 both employ a liquid-state reverse-flow washing tower. The primary fluorine absorbing tower 5 mainly comprises a fluosilicic acid washing pipe 51 and a fluosilicic acid separating tank 52, the fume outlet 12 of the mist removing and separating tower 4 is communicated with an inlet of the fluosilicic acid washing pipe 51 via a pipe, an outlet of the fluosilicic acid washing pipe 51 is communicated with a middle portion of the fluosilicic acid separating tank 52, a fume outlet 12 is disposed on top of the fluosilicic acid separating tank 52, a fluosilicic acid solution outlet 53 is disposed on the bottom, the fluosilicic acid solution outlet is communicated with a nozzle 35 in the fluosilicic acid washing pipe 51 via a circulating and delivering pipe having a circulating pump 2, and fluosilicic acid separating tank 52 also serves as an acid circulating tank of the circulating and delivering pipe. The fluosilicic acid solution outlet 53 is additionally connected with an external fluosilicic acid refining apparatus 54 (or a villiaumite processing apparatus) via a feed pipe having a feeding pump, filter-pressing treatment is performed first through the filter-pressing device 21 prior to the fluosilicic acid refining apparatus 54, and an overflow port of the filter-pressing device 21 is then connected to the fluosilicic acid refining apparatus 54 via a pipe.

The structure of the secondary fluorine absorbing tower 6 is similar to the primary fluorine absorbing tower 5, the secondary fluorine absorbing tower 6 mainly comprises a secondary fluosilicic acid washing pipe 61 and a secondary fluosilicic acid separating tank 62, the fume outlet 12 of the primary fluorine absorbing tower 5 is communicated with an inlet of the secondary fluosilicic acid washing pipe 61, an outlet of the secondary fluosilicic acid washing pipe 61 is communicated with a middle portion of the secondary fluosilicic acid separating tank 62, a despumation layer and a fume outlet 12 are disposed on top of the secondary fluosilicic acid separating tank 62, a fluosilicic acid solution outlet 53 is disposed on the bottom, and the fluosilicic acid solution outlet 53 is communicated with a nozzle 35 in the secondary fluosilicic acid washing pipe 61 via the circulating and delivering pipe having a circulating pump 2. A fluosilicic acid cooler 63 is further provided on the circulating and delivering pipe of the secondary fluorine absorbing tower 6, an inlet of the fluosilicic acid cooler 63 is connected with the circulating pump 2 and its outlet is divided into two paths: one path is communicated with the nozzle 35 in the secondary fluosilicic acid washing pipe 61, the other path is communicated with a spraying layer at the top of the secondary fluosilicic acid separating tank 62, and the secondary fluosilicic acid separating tank 62 also serves as an acid circulating tank of the circulating and delivering pipe. An outlet of the circulating pump 2 of the secondary fluorine absorbing tower 6 is connected with a liquid inlet of the fluosilicic acid separating tank 52 of the primary fluorine absorbing tower 5 via a branch pipe, thereby allowing redundant fluosilicic acid solution of the secondary fluorine absorbing tower 6 to crossflow to the primary fluorine absorbing tower 5.

To achieve emission of all pollutants by standard, an exhaust gas absorbing tower 7 is finally connected in the fluorine recovery apparatus according to the present embodiment, the fume outlet of the secondary fluorine absorbing tower 6 is communicated with the fume inlet 11 of the exhaust gas absorbing tower 7 via a pipe. A bottom in the tower is provided with an absorption liquid box (sodium hydroxide solution) whose outlet is connected with the respective spraying layers of the exhaust gas absorbing tower 7 via the circulating and delivering pipe having the circulating pump 2 to thereby form an exhaust gas absorbing, cyclical spraying system. A fume outlet 12 is disposed at the top of the exhaust gas absorbing tower 7, the fume after washing by the exhaust gas absorbing tower 7 is discharged outward from the fume outlet 12 to funnel via a blower 8.

The operating principle of the phosphoric acid preparing apparatus of the present embodiment is as follows (seen FIG. 1-5):

1 Absorption of $P_2O_5$ by Hydration in the Hydration Tower

The fume (specific example is the fume exiting the kiln in a kiln phosphoric acid process, which temperature is over 500 and content of $P_2O_5$ is 80 g/Nm$^3$) containing $P_2O_5$ and fluorine is introduced into the tower through the fume inlet 11 in the lower portion of the hydration tower 1, the circulating pump 2 of the acid solution cyclical spraying system is started previously, so that concentrated phosphoric acid solution in the hydration tower 1 is sprayed through upper and intermediate concentrated phosphoric acid spraying layers 24, partial nozzles of the uppermost concentrated phosphoric acid spraying layer 24 spray towards an inner wall from slantly underneath and remaining nozzles spray vertically downward, nozzles of the intermediate and lower spraying layers spray vertically downward, the sprayed concentrated phosphoric acid solution is in full contact with fume reverse flow entering the tower and containing $P_2O_5$ and fluorine for mass transfer and heat transfer, $P_2O_5$ in the fume is subjected to chemical reaction with water in the concentrated phosphoric acid solution to produce phosphoric acid, more than half of the produced phosphoric acid is absorbed into the spraying liquid, the remaining portion forms phosphoric acid mist and remains in gas phase; it is very difficult that fluorine (such as $SiF_4$ and HF) in the fume is absorbed in the spraying liquid under the condition of concentrated phosphoric acid and a higher temperature; the temperature of the fume, after passing through heat transfer with the cyclically-sprayed lower-temperature concentrated phosphoric acid solution and the cooling by the water-cooling system 17 in the hydration tower 1, drops to 75-130, and the temperature of cyclic concentrated phosphoric acid solution exiting the hydration tower 1 is raised to 70-95. According the moisture content in the fume, a mass percentage concentration of the cyclically-sprayed concentrated phosphoric acid solution is selected from a range 60%-90% (phosphoric acid solution with 70%-85% concentration is employed in the present embodiment), the temperature of the concentrated phosphoric acid solution upon entering the hydration tower is controlled in a range of 50-80, and a spraying liquid-gas ratio is controlled in a range of 3 $L/m^3$-20 $L/m^3$. The fume exiting the tower entrains much phosphoric acid mist exiting in the form of mist, which cannot settle in the hydration tower 1 and is carried out of the hydration tower 1 along with the fume. The hydration tower 1 has double functions of cooling fume and absorbing $P_2O_5$ by hydration, wherein a chemical reaction mainly occurring is as follows:

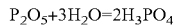

The concentrated phosphoric acid solution sprayed and falling down in the hydration tower 1 finally enters the acid solution cyclical spraying system through the liquid inlet 14, then flows in the acid cooler 18, the acid cooler 18 is structured in a way that several heat exchange plates made of stainless steel pipe are arranged in an agitation tank, cyclical cooling water is introduced in the pipes; through agitation, the phosphoric acid solution entering the acid cooler 18 forms forced convection and heat exchange on the heat exchange plates, thereby improving the heat transfer efficiency; a caloric content portion in the concentrated phosphoric acid is transferred to the cyclic cooling water of the acid cooler 18, and the cyclic cooling water constantly transfers the heat of the cyclic concentrated phosphoric acid solution. The cyclical acid solution flowing out of the outlet of the acid cooler 18 enters the phosphoric acid storage tank 16 and sent by the circulating pump 2 again to respective nozzles of the upper and intermediate concentrated phosphoric acid spraying layers 24 for cyclical spraying.

2 Capture of Phosphoric Acid Mist in the Phosphoric Acid Mist Capturing Tower

The gas phase substance (namely fume) discharged out of the fume outlet 12 at the top of the hydration tower 1 enters the washing pipe 31 of the phosphoric acid mist capturing tower 3. The tower is a fluid-state reverse-flow washing tower. The cyclical dilute phosphoric acid solution is sprayed from down to up in the washing pipe 31, the dilute phosphoric acid solution impinges and contacts with the up-down high-speed fume flow to form a strong turbulence area at a gas-liquid interface area, fluid momentum, after reaching balance, establishes a stable foam area (foam column) having a certain height, the fume passes through the foam area and contacts a large-area phosphoric acid liquid surface which updates constantly, capture, polymerization and growth of particles and heat transfer occurs in the foam area, a majority of phosphoric acid mist entrained in the fume is transferred to the cyclical dilute phosphoric acid solution, a fume appearance flow rate in the absorption area is 10 m/s-30 m/s, and the liquid-gas ratio is 3 $L/m^3$-25 $L/m^3$.

The temperature of the fume, through evaporation of moisture content in the cyclical dilute phosphoric acid solution in a heat insulation manner, further falls to 60-75. As compared with a conventional heat-method phosphoric acid Venturi demister, to achieve the same mist removing effect, the phosphoric acid mist capturing tower according to the present invention substantially reduces loss of dynamic pressure head and decrease energy consumption of the acid collecting device.

The cyclically sprayed acid solution in the phosphoric acid mist capturing tower 3 employs dilute phosphoric acid solution with 10%-50% mass percentage concentration, gas and liquid in the washing pipe 31 enters the separating tank 32 in the lower portion of the tower for gas-liquid separation, the cyclical acid solution falls into the bottom of the separating tank 32, the separating tank 32 of the tower meanwhile serves as a cyclic acid tank, and the dilute phosphoric acid solution at the bottom is delivered back from the circulating pump 2 to the washing pipe 31 or crossflows into the dilute phosphoric acid spraying layer 25 of the hydration tower 1 according to needs.

3 Capturing of the Phosphoric Acid Mist in the Mist Removing and Separating Tower The fume discharged out of the fume outlet 12 in the phosphoric acid mist capturing tower 3 enters the mist removing and separating tower 4 for further gas-liquid separation to further remove phosphoric acid mist in the fume, the lower portion of the mist removing and separating tower is designed a phosphoric acid liquid droplet capturing structure 43 similar to a cyclone deduster, a centrifugal force is utilized to capture already grownup phosphoric acid droplets from the fume, a wire mesh demister 42 is mounted at an upper portion of the mist removing and separating tower to further capture not-yet-grownup phosphoric acid mist droplets in the fume to ensure a direct recovery rate of $P_2O_5$ of the apparatus; fume from which phosphorus is absorbed by hydration, discharged out of the mist removing and separating tower 4, is delivered to the fluorine recovery apparatus for fluorine recovery treatment.

Since water is consumed to chemically combine $P_2O_5$ in the fume during absorption of phosphorus by hydration, and furthermore, partial moisture content is evaporated from the spraying acid solution in the course of reducing the temperature of the fume, water needs to be replenished constantly during absorption by hydration. The quantity of water to be replenished in the process system in the present embodiment is totally replenished from the fume outlet 12 of the mist removing and separating tower 4. At this time, the online water-washing device 41 not only serves as a water replenishing device and meanwhile serves as a washing device of the wire mesh demister on the upper portion of the mist removing and separating tower 4. Since all the replenished water is added to the mist removing and separating tower 4, and the bottom liquid in the mist removing and separating tower 4 flows through the acid solution inlet 34 of the phosphoric acid mist capturing tower 3 back into the phosphoric acid mist capturing tower 3, so the concentration of the cyclic acid solution in the phosphoric acid mist capturing tower 3 will gradually falls. On the other hand, since $P_2O_5$ in the fume is constantly absorbed in the hydration tower 1, the concentration of the cyclical acid solution therein gradually increases. Hence, crossflow of acid is needed for the cyclic acid solution system of the hydration tower 1 and the phosphoric acid mist capturing tower 3 to keep concentration of respective cyclical acid solutions stable. The acid crossflowing from the hydration tower 1 to the phosphoric acid mist capturing tower 3 is clarified and filtered in the filler filtering device 22 and then introduced to the phosphoric acid capturing tower 3, and acid crossflowing from the phosphoric acid mist capturing tower 3 to the hydration tower 1 is directly introduced out from the outlet of the circulating pump 2 of the phosphoric acid mist capturing tower 3. The excess phosphoric acid (acid production corresponding to the mass balance) in process system is introduced out from the supernatant outlet of the filler filtering device 22 thereof into the refining step, active carbon, diatomite and barium salt are added, color and $SO_4^{2-}$ of the crude phosphoric acid are removed, and then a plate-and-frame filter-pressing device is used to remove impurities and perform purification to obtain the concentrated phosphoric acid product. Additionally, the majority of the dust and other solid particles in the fume are transferred to the cyclic phosphoric acid solution and enriched in a bottom flow of the filler filtering device 22, the bottom flow is discharged to the filter-pressing device 21 for filtering, filtrate is back into an acid solution storage tank 16, filter residue is discharged to the external system.

4 Primary Fluorine Absorption

The fume after absorption of phosphorus by hydration is delivered to the fluosilicic acid washing pipe 51 of the primary fluorine absorbing tower 5, the fume goes from up to down and comes into sufficient gas and liquid two-phase contact with the cyclical fluosilicic acid solution (mass percentage concentration is 8%-20%) sprayed in from down to up and performs mass transfer, heat transfer and chemical reaction, most fluorine (mainly, silicon tetrafluoride) in the fume reacts with water to produce fluosilicic acid, and meanwhile the fume, through evaporation of moisture content in the cyclical fluosilicic acid solution in a heat insulation manner, further falls to 50-70; a chemical reaction mainly occurring in this step is as follows:

$3SiF_4+3H_2O=2H_2SiF_6+SiO_2.H_2O$.

5 Primary Gas-Liquid Separation

The product finally obtained in the fluosilicic acid washing pipe 51 is totally transferred to the fluosilicic acid separating tank 52 for gas-liquid separation, gas after separation enters the secondary fluosilicic acid washing pipe 61 of the secondary fluorine absorbing tower 6 through the fume outlet of the primary fluorine absorbing tower 5, liquid after separation stays in the fluosilicic acid separating tank 52 and is delivered through the cyclical delivering pipe having the circulating pump back to fluosilicic acid washing pipe 51 to perform operation in the above step 4.

6 Secondary Fluorine Absorption

The fume entering the secondary fluosilicic acid washing pipe 61 goes from up to down and comes into sufficient gas and liquid two-phase contact with the cyclical fluosilicic acid solution (mass percentage concentration is 0.5%-5%) sprayed in from down to up and performs mass transfer, heat transfer and chemical reaction, a remaining fluorine-containing substance (mainly $SiF_4$) in the fume is reacted with water to produce fluosilicic acid, meanwhile caloric content in the fume is, through heat transfer, mostly transferred again to the cyclical fluosilicic acid solution; a temperature of the product after treatment in step (3) further falls below 60; the chemical reaction mainly occurring in this step is identical with that in step 4.

7 Secondary Gas-Liquid Separation

The product finally obtained in the secondary fluosilicic acid washing pipe 61 is totally transferred to the secondary fluosilicic acid separating tank 62 for gas-liquid separation, a demisting unit is disposed on top of the secondary fluosilicic acid separating tank 62 to remove mist entrained in the fume to improve the absorption rate of fluorine, and the demisting unit is cleaned by spraying in cyclical fluosilicic acid solution from the top. The separated gas goes through the fume outlet of the secondary fluorine absorbing tower 6 into the subsequent exhaust gas absorbing tower 7 for treatment. The separated liquid stays in the secondary fluosilicic acid separating tank 62 and is delivered back to the secondary fluosilicic acid washing pipe 61 via the cyclical delivering pipe having the circulating pump 2 to perform the operation in the above step 6, the cyclical delivering pipe is mounted with a fluosilicic acid cooler 63 so as to remove partial heat in the cyclical fluosilicic acid solution so that fluorine absorption reaction is performed at a more suitable temperature. The cyclical fluosilicic acid solution entering the secondary fluosilicic acid washing pipe 61 is subjected to the cooling treatment of the fluosilicic acid cooler 63; partial redundant cyclical fluosilicic acid solution may be directly discharged into the fluosilicic acid separating tank 52 of the primary fluorine absorbing tower 5.

The cyclical fluosilicic acid solution in the primary fluorine absorbing tower 5 and the secondary fluorine absorbing tower 6 is accumulated as absorbing fluorine in the fume, concentration of fluosilicic acid in the primary fluorine absorbing tower 5 increases as absorbing fluorine-containing substance in the fume, the redundant cyclical fluosilicic acid solution in the secondary fluorine absorbing tower 6 is discharged into the primary fluorine absorbing tower 5 to maintain its concentration constant, finally the redundant cyclical fluosilicic acid solution in the primary fluorine absorbing tower 5 is delivered via a feeding pump to the filter-pressing device 21 to perform filter-pressing to remove solid substances such as silica gel therein, the filtrate goes through the fluosilicic acid refining step to produce fluosilicic acid final product or is processed into villiaumite product; the filtration residue is silica gel and cleaned to remove impurities to serve as a by-product.

8 Exhaust Gas Absorbing and Purifying Treatment

The fume entering the subsequent exhaust gas absorbing tower 7 comes into reverse-flow contact with downwardly-sprayed NaOH solution during upward movement of the exhaust gas absorbing tower 7, an absorption liquid tank on the bottom of the exhaust gas absorbing tower 7 is connected with respective spraying layers in the tower via the circulating pump 2 to form a cyclical spraying system; to keep the absorbing capability of the absorption liquid, pH value of the absorption liquid is maintained above 8, and dilute alkaline solution (NaOH solution) needs to be added constantly. However, the absorption liquid is accumulated as the dilute alkaline solution is added and impurities in the fume such as $P_2O_5$ and fluorine are absorbed, it needs to be discharged constantly for sewage treatment, and water recovered from the treatment may be used to the raw material step of the kiln phosphoric acid production process; the remaining pollutants in the fume such as $P_2O_5$, $SiF_4$ and dusts are absorbed by the spraying liquid, the fume is further cleaned and purified to reach the state emission standard (the fluorine content in the gas falls below 9 mg/m³), and then discharged by an induced draft fan to the chimney for emission. Chemical reactions mainly occurring in this step are as follows:

$$3SiF_4 + 6NaOH = 2Na_2SiF_6 + Na_2SiO_3 + 3H_2O$$

$$P_2O_5 + 6NaOH = 2Na_3PO_4 + 3H_2O.$$

What are described above are only preferred embodiments of the present invention. Equivalent modifications, variations and improvements made on the basis of the above technical solutions all fall within the protection scope of the present invention.

The invention claimed is:

1. An apparatus for preparing phosphoric acid from a fume exiting the kiln in a kiln phosphoric acid process, the apparatus comprises a hydration tower and an acid solution cyclical spraying system, a fume inlet of the fume exiting the kiln is disposed at a lower portion of the hydration tower, a fume outlet after hydration and absorption is disposed at the top, a spraying device is disposed in a cavity of the hydration tower above the fume inlet, a liquid inlet of the acid solution cyclical spraying system is disposed on a bottom of the hydration tower, a liquid outlet of the acid solution cyclical spraying system is connected to a liquid intake pipe of the spraying device.

2. The apparatus for preparing phosphoric acid according to claim 1, wherein a phosphoric acid mist capturing tower and a mist removing and separating tower are connected with the hydration tower.

3. The apparatus for preparing phosphoric acid according to claim 2, wherein the phosphoric acid mist capturing tower mainly comprises a washing pipe and a separation tank, a fume outlet of the hydration tower is communicated with an inlet of the washing pipe via a pipe, an outlet of the washing pipe is communicated with a middle portion of the separation tank, a top portion of the separation tank is provided with the fume outlet, an acid solution outlet is disposed on the bottom, the acid solution outlet is communicated with a nozzle in the washing pipe via a circulating and delivering pipe with the circulating pump.

4. The apparatus for preparing phosphoric acid according to claim 3, wherein the fume outlet of the phosphoric acid mist capturing tower is communicated with a lower portion of a mist removing and separating tower through a pipe, a top of the mist removing and separating tower is provided with the fume outlet, a bottom of the mist removing and separating tower is provided an acid solution outlet, and the acid solution outlet is communicated with an acid solution inlet of the phosphoric acid mist capturing tower via a pipe.

5. The apparatus for preparing phosphoric acid according to claim 4, wherein an online water-washing device is disposed in the mist removing and separating tower.

6. The apparatus for preparing phosphoric acid according to claim 5, wherein an upper portion of the mist removing and separating tower is mounted with a wire mesh demister, a lower portion is designed as a phosphoric acid solution droplet capturing structure like a cyclone deduster, and the online water-washing device is mounted above the wire mesh demister.

7. The apparatus for preparing phosphoric acid according to claim 6, wherein the fume outlet of the mist removing and separating tower is communicated with a fluorine absorbing device, the fluorine absorbing device is a primary fluorine absorption tower as the main body, the primary fluorine absorption tower employs a liquid-state reverse-flow washing tower, and mainly comprises a fluosilicic acid washing pipe and a fluosilicic acid separating tank.

8. The apparatus for preparing phosphoric acid according to claim 7, wherein the fume outlet of the mist removing and separating tower is communicated with an inlet of the fluosilicic acid washing pipe via a pipe, an outlet of the fluosilicic acid washing pipe is communicated with a middle portion of the fluosilicic acid separating tank, a fume outlet is disposed on top of the fluosilicic acid separating tank, a fluosilicic acid solution outlet is disposed on the bottom, the fluosilicic acid solution outlet is communicated with a nozzle in the fluosilicic acid washing pipe via a circulating and delivering pipe having a circulating pump, the fluosilicic acid solution outlet is additionally connected with an external fluosilicic acid refining apparatus or a villiaumite processing apparatus via a pipe.

9. The apparatus for preparing phosphoric acid according to claim 8, wherein the fluorine absorption device further comprises a secondary fluorine absorbing tower, the secondary fluorine absorbing tower employs a liquid-state reverse-flow washing tower, and mainly comprises a secondary fluosilicic acid washing pipe and a secondary fluosilicic acid separating tank.

10. The apparatus for preparing phosphoric acid according to claim 9, wherein the fume outlet of the primary fluorine absorption tower is communicated with an inlet of the secondary fluosilicic acid washing pipe, an outlet of the secondary fluosilicic acid washing pipe is communicated with a middle portion of the secondary fluosilicic acid separating tank, a despumation layer and a fume outlet are disposed on top of the secondary fluosilicic acid separating tank, a fluosilicic acid solution outlet is disposed on the bottom, and the fluosilicic acid solution outlet is communicated with the secondary fluosilicic acid washing pipe and the fluosilicic acid separating tank of primary fluorine absorbing tower via the circulating and delivering pipe having a circulating pump.

11. The apparatus for preparing phosphoric acid according to claim 10, wherein a fluosilicic acid cooler is further provided on the circulating and delivering pipe of the secondary fluorine absorbing tower, an outlet of the fluosilicic acid cooler is communicated with a nozzle in the secondary fluosilicic acid washing pipe and a spraying layer at the top of the secondary fluosilicic acid separating tank.

12. The apparatus for preparing phosphoric acid according to claim 11, wherein the fume outlet of the secondary fluorine absorbing tower is further connected with an exhaust gas absorbing tower which is a spraying empty tower, a fume outlet is disposed at the top of the exhaust gas absorbing tower, a spraying layer is disposed at an upper portion in the tower, a bottom in the tower is provided with a alkali absorption liquid box whose outlet is connected with the respective spraying layers of the exhaust gas absorbing tower via the circulating and delivering pipe having the circulating pump.

13. The apparatus for preparing phosphoric acid according to claim 3, wherein the spraying device comprises at least two spraying layers located at different heights of the cavity of the hydration tower, the at least two spraying layers comprise a dilute phosphoric acid spraying layer and a concentrated phosphoric acid spraying layer, and the concentrated phosphoric acid spraying layer is disposed above the dilute phosphoric acid spraying layer; a liquid intake pipe of the concentrated phosphoric acid spraying layer is communicated with the acid solution cyclical spraying system, a liquid intake pipe of the dilute phosphoric acid spraying layer is communicated with a circulating and delivering pipe of the phosphoric acid mist capturing tower; the delivering pipe of the acid solution cyclical spraying system after the circulating pump is connected to an acid solution inlet of the phosphoric acid mist capturing tower via a branch pipe.

14. The apparatus for preparing phosphoric acid according to claim 13, wherein the branch pipe is provided with a filler filtering device, an acid inlet of the filler filtering device is communicated with the acid solution cyclical spraying system via the branch pipe, a filtering outlet of the filler filtering device is divided into three paths: one path is communicated with the acid solution inlet of the phosphoric acid mist capturing tower, a second path is communicated with an external phosphoric acid refining apparatus, and a third path is communicated with the acid solution storage tank; a bottom flow outlet of the filler filtering device is connected to a feed port of a filter-pressing device via a pipe, an overflow port of the filter-pressing device is communicated with the acid solution storage tank in the acid solution cyclical spraying system via a pipe.

15. The apparatus for preparing phosphoric acid according to claim 1, wherein a body of the hydration tower is a spraying empty tower.

16. The apparatus for preparing phosphoric acid according to claim 1, wherein an acid solution storage tank and a circulating pump are further disposed in the acid solution cyclical spraying system.

17. The apparatus for preparing phosphoric acid according to claim 1, wherein the apparatus further comprises cooling system, the cooling system comprises the following structures a and/or b:
   a. a water-cooling system is provided around an outer wall of the cavity of the hydration tower;
   b. an acid cooler is disposed at a position of the acid solution cyclical spraying system adjacent to the fluid inlet.

* * * * *